C. J. TAGLIABUE.
Hydrometer Pump.

No. 218,331.  Patented Aug. 5, 1879.

Witnesses.
Chas Wahlers
William Miller

Inventor.
Chas J. Tagliabue
by Van Santvoord & Hauff
his attys

UNITED STATES PATENT OFFICE.

CHARLES J. TAGLIABUE, OF NEW YORK, N. Y.

IMPROVEMENT IN HYDROMETER-PUMPS.

Specification forming part of Letters Patent No. 218,331, dated August 5, 1879; application filed June 12, 1879.

*To all whom it may concern:*

Be it known that I, CHARLES J. TAGLIABUE, of the city, county, and State of New York, have invented a new and Improved Hydrometer-Pump, which invention is fully set forth in the following specification, reference being had to the accompanying drawings, in which—

Figure 1:
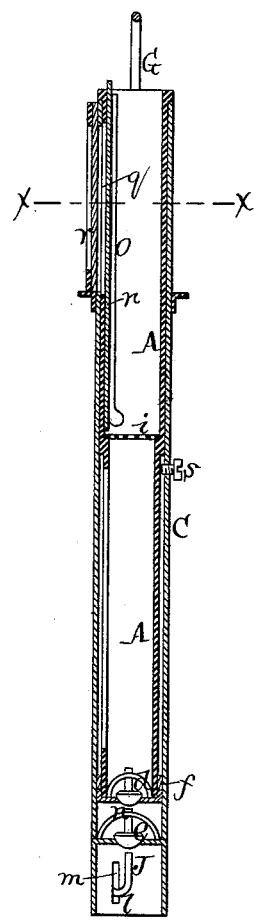
Figure 2:
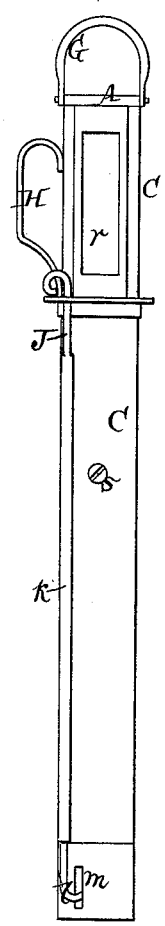
Figure 3:
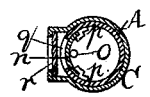

Figure 1 represents a vertical section of an apparatus embodying my invention. Fig. 2 is a side view thereof. Fig. 3 is a cross-section on the line $x\,x$, Fig. 1.

Similar letters indicate corresponding parts.

My invention relates to pumps for taking liquids from barrels or other vessels, for the purpose of testing the same; and it consists in a hollow plunger, the upper part of which is adapted to receive a hydrometer, a cylinder surrounding the hollow plunger, and two valves, one at the bottom of the plunger and the other at the bottom of the cylinder, so organized that liquid may be pumped into the cylinder and thence into the plunger by a few up-and-down strokes of the latter within the cylinder. A lifting-rod is combined with the cylinder-valve, and the latter has an upwardly-projecting stem, adapted to actuate the plunger-valve, for the purpose of emptying the pump.

In the drawings, the letter A designates a hollow plunger, which is so constructed that its upper part forms a receptacle for a hydrometer. C is a cylinder, into which the plunger is fitted, and $d\,e$ are two valves, one at the bottom of the plunger A, and the other at the bottom of the cylinder C, both of these valves being self-acting, and both being, moreover, arranged to open in an upper direction. On the lower end of the plunger A is arranged a packing-ring, $f$.

In practice the cylinder C is immersed in the liquid to be tested, as by inserting the same into the bung-hole of a barrel. The plunger A is then pulled up or outward, whereby the cylinder-valve $e$ is caused to open, and the liquid is drawn into the cylinder. The plunger A is then pushed back, when its valve $d$ opens and the liquid is forced into the plunger, where it may be conveniently tested by means of a hydrometer.

A handle, G or H, is attached both to the cylinder and to the plunger, while at a certain distance from the top or open end of the plunger is arranged a perforated plate, $i$, serving to keep the hydrometer above that point without stopping the flow of liquid.

The letter J designates a rod which slides in a guide, $k$, formed on the outside of the cylinder C, and which has a return bend, $l$, at the lower end, passing through a slot, $m$, in the cylinder. If this rod J is drawn upward, which may be done by taking hold of the same at the upper end, where it is suitably bent, the lower extremity thereof comes in contact with the cylinder-valve $e$ and opens the same. This valve $e$ then in turn acts upon the plunger-valve $d$ by means of its stem $n$, which is projected upward for this purpose, whereupon the liquid contained in the plunger returns to the cylinder, and is permitted to escape.

The letter O designates a thermometer combined with the plunger A, the function of this thermometer being to show the temperature of the liquid that may be contained in the plunger. I attach this thermometer to a plate, $n$, sliding in guides $p$ on the inside and upper part of the plunger, and in that part of the side of the plunger opposite the thermometer I form a slot, $q$, while at a point opposite this slot in the cylinder C I arrange a glass face, $r$. By this means the thermometer O is rendered visible from the outside of the cylinder.

In some cases I form a gutter at the upper edge of the cylinder C, to receive any overflow from the plunger A, and connect this gutter with the lower part of the cylinder by a tube or other suitable means. I also attach to the cylinder a stop, $s$, to regulate the upper or outer position of the plunger, which stop may be arranged to guide the plunger in its up-and-down motions.

The thermometer O is preferably arranged to project down to a point near the middle of the plunger, so as to show the temperature of the liquid at that part of the plunger.

What I claim as new, and desire to secure by Letters Patent, is—

1. In combination with the cylinder C, provided with a valve, $e$, at its bottom, the hollow plunger A, provided with a valve, $d$, at its bottom, and divided into two compartments by a foraminous partition, $i$, the upper compartment serving as a hydrometer-receptacle, substantially as and for the purposes specified.

2. The combination of the plunger A, the cylinder C, the lifting-rod J, and the valves $e$ and $d$, the valve $e$ adapted to be actuated by the rod J to lift the valve $d$ and discharge the contents of the plunger, substantially as specified.

In testimony whereof I have hereunto set my hand and seal this 11th day of June, 1879.

CHAS. J. TAGLIABUE. [L. S.]

Witnesses:
    J. VAN SANTVOORD,
    CHAS. WAHLERS.